United States Patent [19]

Cotreau et al.

[11] Patent Number: 5,659,570

[45] Date of Patent: Aug. 19, 1997

[54] CIRCUIT AND METHOD FOR LOOPBACK TEST AND ON-HOOK TRANSMISSION INTEGRATED IN A TELEPHONE SUBSCRIBER LINE INTERFACE CIRCUIT

[75] Inventors: Gerald Michael Cotreau, Melbourne; Christopher Ludeman, Palm Bay; Donald Karl Whitney, Jr., West Melbourne, all of Fla.

[73] Assignee: Harris Corporation, Melbourne, Fla.

[21] Appl. No.: 380,411

[22] Filed: Jan. 30, 1995

[51] Int. Cl.$^6$ ............................. H04M 1/24; H04M 1/00
[52] U.S. Cl. ............................. 375/5; 379/32; 379/402; 379/412
[58] Field of Search ............................. 375/1, 5, 22, 24, 375/27, 29, 32, 399, 400, 402, 412; 370/13, 14, 241, 244, 249, 250, 251; 379/382

[56] References Cited

U.S. PATENT DOCUMENTS 5,003,573  3/1991  Agah et al. ............................. 379/27
5,111,497  5/1992  Bliven et al. ............................. 379/27
5,504,753  4/1996  Renger et al. ............................. 379/27
5,515,434  5/1996  Cotreau ............................. 379/399

*Primary Examiner*—Curtis Kuntz
*Assistant Examiner*—Paul Loomis
*Attorney, Agent, or Firm*—Rogers & Killeen

[57] ABSTRACT

A method and circuit for loopback testing a telephone subscriber line interface circuit (SLIC) includes current sources connected to each of tip and ring circuits from which switch-hook is detected in the SLIC. A loopback test of the SLIC is conducted when the telephone is on-hook and is successful when the current from the current sources simulates a switch-hook detection. The current sources may also be used during on-hook transmission. A ground key detect circuit in the SLIC may be used to verify a successful loopback test by using current from the current sources in the ground key detect circuit to check for a grounded ring circuit in the SLIC.

18 Claims, 3 Drawing Sheets

CIRCUIT AND METHOD FOR LOOPBACK TEST AND ON-HOOK TRANSMISSION INTEGRATED IN A TELEPHONE SUBSCRIBER LINE INTERFACE CIRCUIT

BACKGROUND OF THE INVENTION

The present invention is related to telephone subscriber line interface circuits (SLICs), and more particularly to a method and circuit for performing a loopback test of a SLIC that may also be used for on-hook transmission.

With reference to FIG. 1, a telephone system may include a subscriber telephone 12 connected to a central office through a telephone subscriber line interface circuit (SLIC) 14. The telephone 12 may be represented by a bell 12a, a capacitor 12b for blocking dc signals, voice circuitry 12c, and a switch hook 12d. The SLIC connects a balanced two wire transmission path (the path to and from the subscriber telephone) with an unbalanced four wire transmission path (the path to and from the distribution circuitry in the telephone central station). SLICs perform various functions, including battery feed, overvoltage protection, ringing, signaling, hybrid, and timing. SLIC operation is known and need not be considered in detail, and only portions of the SLIC 14 that may facilitate an understanding of the background of the present invention are shown in FIG. 1.

Telephone systems operate in potentially harsh environments and may have portions of the system exposed to faults, such as short circuits from accidental grounding, power lines, lightning, etc. that may damage system components. The overvoltage function of the SLIC is designed to protect the SLIC from such faults. If the SLIC does not detect the fault, however, the SLIC may attempt to drive the short and overheat, thereby damaging SLIC components. A loopback test may be conducted to determine whether certain SLIC components have been damaged. The loopback test is conducted when the telephone is not is use (it is on-hook) by switching a dummy load to the line. In FIG. 1, the dummy load is represented by resistor $R_{dum}$ that may be selectably connected across the line with switch 16. An ac signal is typically applied to the receive pin Rx at the four wire side of the SLIC. The ac signal appears at the two wire side of the SLIC across the dummy load and thereafter at the transmit pin Tx at the four wire side of the SLIC. The amplitude of the ac signal at the transmit pin indicates whether a component has been damaged.

Another function of a SLIC is to supervise telephone operation by detecting when a request for service is made at a telephone. The request for service is made by lifting the handset from the cradle, thereby activating the telephone's hook switch. As indicated in FIG. 1, the request for service is made by closing switch 12d. When switch 12d is closed, a dc load is applied between nodes VT and VR. The closing of switch 12d is referred to as a switch-hook and is detected by the SLIC.

Switch-hook detection (SHD) occurs when the dc current through the telephone line (the line current) exceeds a predetermined magnitude, referred to a threshold current, $I_{SHD}$. As indicated in FIG. 1, the line current comprises a current $I_T$ that is proportional to tip voltage plus the amplifier gain G times $I_T$. Typically, a voltage across a resistor $R_{SHD}$ in series with the telephone is measured and compared to reference voltage in a comparator 18, where $R_{SHD}$ and the reference voltage have been selected so that a switch-hook detection is indicated when the line current exceeds $I_{SHD}$. When the measured voltage exceeds the reference voltage, the comparator 18 sends a SHD signal to the SLIC to indicate a request for service. The request for service indication is maintained until the measured voltage no longer exceeds the reference voltage. When the measured voltage no longer exceeds the reference voltage the telephone is disconnected.

As will be appreciated, the dummy load and switch 16, and the need to provide an ac signal generator for the test signal add cost, complexity, and size to the SLIC and/or telephone system. It is desirable to be able to perform the loopback test without these components, and more desirable to bring the test function on-chip, when the SLIC has portions in an integrated circuit. Further, it is desirable to use loopback test components for other purposes to further decrease the number of components needed for telephone system operation.

Accordingly, it is an object of the present invention to provide a novel method and circuit for a SLIC that obviates the problems of the prior art.

It is another object of the present invention to provide a novel method and circuit for loopback testing a SLIC that uses the switch-hook detection circuit of the SLIC.

It is yet another object of the present invention to provide a novel method and circuit for loopback testing a SLIC in which separate current sources are connected to each of tip and ring circuits from which switch-hook is detected in the SLIC and in which a loopback test uses current from the current sources.

It is still another object of the present invention to provide a novel method and circuit for loopback testing a SLIC in which a switch-hook detection indication is provided and a ground key detection indication is not provided when the loopback test is successful.

It is a further object of the present invention to provide a novel method and circuit for performing loopback testing and on-hook transmission in a SLIC in which a loopback test uses current from separate current sources in the switch-hook detection circuit of the SLIC, and in which on-hook transmission uses current from the same current sources.

It is yet a further object of the present invention to provide a novel method and circuit for on-hook transmission in a SLIC in which separate current sources in the switch-hook detection circuit of the SLIC are used for on-hook transmission and in which a switch-hook detection threshold is reset so that a switch-hook detection is not indicated by the current sources during on-hook transmission.

It is still a further object of the present invention to provide a novel circuit for loopback testing an integrated circuit SLIC in which separate current sources are connected to each of tip and ring circuits with which switch-hook is detected in the SLIC and in which the loopback testing circuit is integrated into the SLIC IC.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
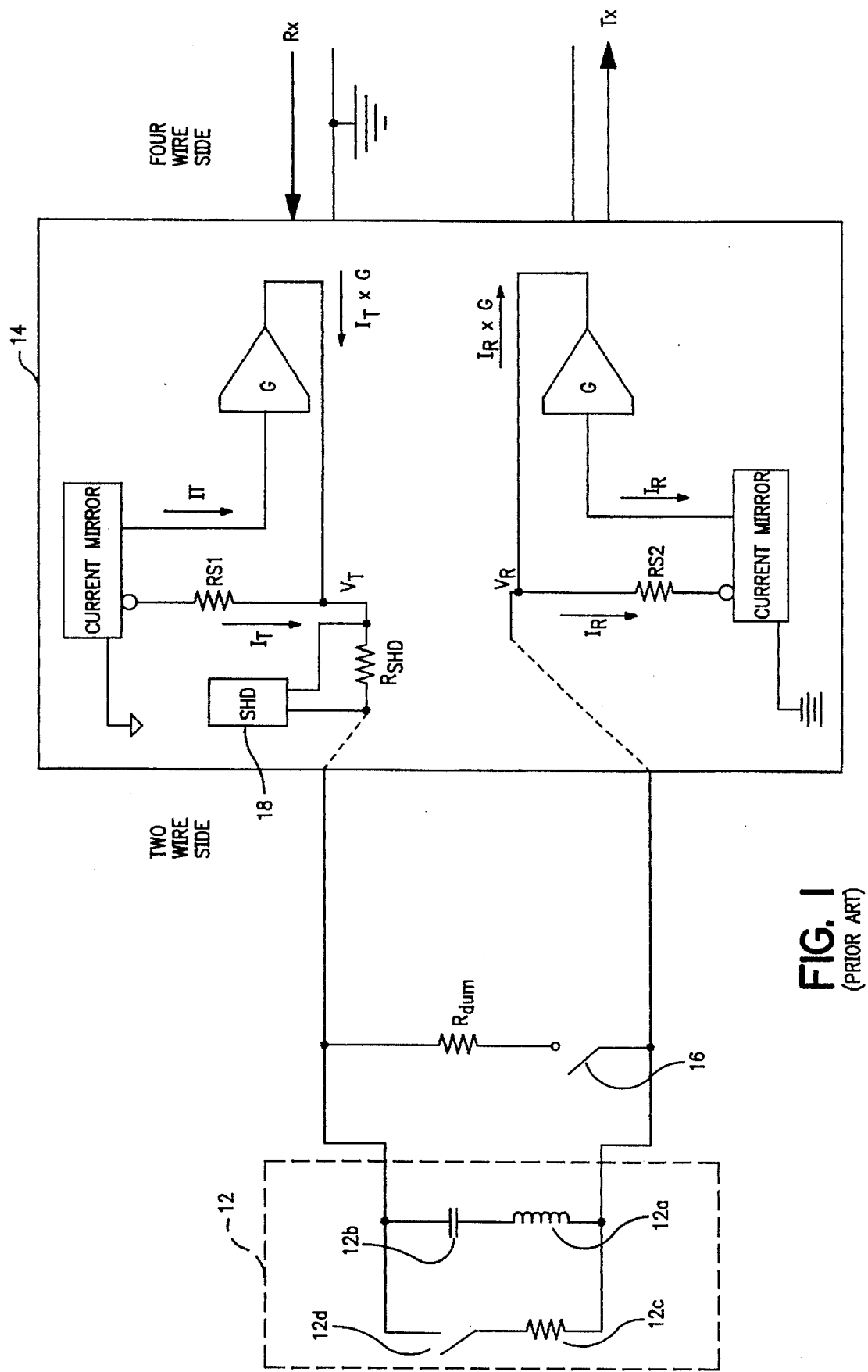
FIG. 1 is a schematic drawing of portions of a telephone system of the prior art illustrating loopback test and switch-hook detection circuitry.
Figure 2:
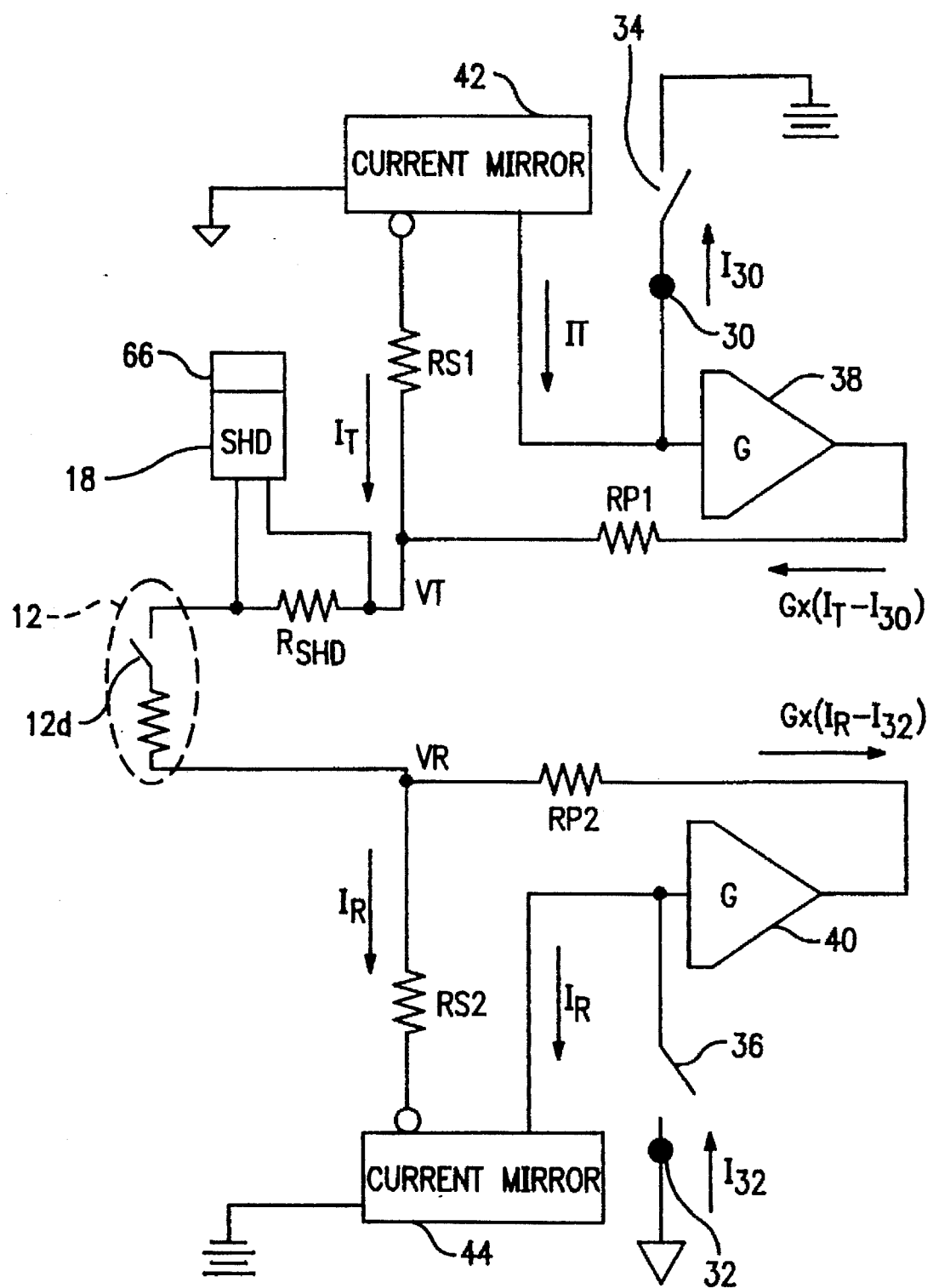
FIG. 2 is a schematic drawing of an embodiment of the present invention illustrating loopback test circuitry.

With reference now to FIG. 2 that illustrates such portions of a telephone system that may facilitate an understanding of the present invention, an embodiment of the present invention may include two current sources 30 and 32, for providing currents $I_{30}$ and $I_{32}$, that are connected by switches 34 and 36 to the inputs of SLIC current amplifiers 38 and 40. When switches 34 and 36 are open, the telephone system operates conventionally. The switches 34 and 36 are closed to conduct a loopback test.

When switches 34 and 36 are closed to conduct a loopback test, current sources 30 and 32 are connected to the inputs of current amplifiers 38 and 40. If the telephone 12 is on-hook (as it should be during a loopback test) the current $I_{30}$ is sunk out of the input to amplifier 38, and amplifier 38 will deliver a current equal to G times $I_T$ minus $I_{30}$ to node VT, thereby pulling the voltage at node VT towards battery (battery being a negative voltage). As the voltage at node VT moves towards battery, the voltage across sense resistor RS1 increases and $I_T$ increases. The voltage at node VT is $I_T$ times the resistance of RS1. The current mirror 42 provides a copy of $I_T$ to the input of amplifier 38. The amplifier 38 will stop driving node VT when its input current is zero, and the input current to amplifier 38 is zero when $I_T$ equals $I_{30}$. Note that the input to amplifier 38 will not actually reach zero unless G is infinite, and since G is large but not infinite, a de minimis current may be provided that need not be considered herein.

The operation of the other half of the circuit is similar. If the telephone 12 is on-hook the current $I_{32}$ is added to the input to amplifier 40, and the output of amplifier 40 will deliver a current equal to G times $I_R$ minus $I_{32}$ to node VR, thereby moving the voltage at node VR towards a more positive voltage (e.g., ground). As VR moves towards a more positive voltage, the voltage across sense resistor RS2 increases and $I_R$ increases. The voltage at node VR is $I_R$ times the resistance of RS2 referenced to battery. The current mirror 44 provides a copy of $I_R$ to the input of amplifier 40. The amplifier 40 will stop driving node VR when its input current is zero, and the input current to amplifier 40 is zero when $I_R$ equals $I_{32}$.

The currents $I_{30}$ and $I_{32}$ may be chosen so that VT and VR move far enough to trip the switch-hook detection circuitry. Thus, the current sources 30 and 32 are used to "simulate" a switch-hook detection, where the "simulated" switch-hook detection indicates a successful loopback test. If a switch-hook detection is not indicated, at least one of the components (e.g., sense resistors RS1 and RS2, protective resistors RP1 and RP2, amplifiers 38 and 40) is not functioning normally.

This method may give a false indication under certain conditions, and another circuit of the SLIC may be used to avoid a false indication. If a resistor is blown, such as protective resistor RP2, and a leakage resistance exists from ground to node VR, the leakage can move the voltage at node VR much more than would occur if the amplifier 40 were connected. This can provide a false SHD indication, and an erroneously indicate a successful loopback test.

A SLIC typically contains a ground key detect (GKD) circuit for indicating when the ring side of the SLIC is connected to ground. A conventional GKD circuit detects when VR is closer to ground than VT is to battery. In an embodiment of the present invention the GKD is expanded to detect an imbalance in either direction, i.e., $I_T>I_R$ and $I_R>I_T$ so that a leakage in either part of the circuit may provide a GKD "true" indication to the SLIC. A successful loopback test would be indicated by a SHD "true" and a GKD "false", while an unsuccessful test would be indicated by SHD "false" or a GKD "true".

Figure 3:
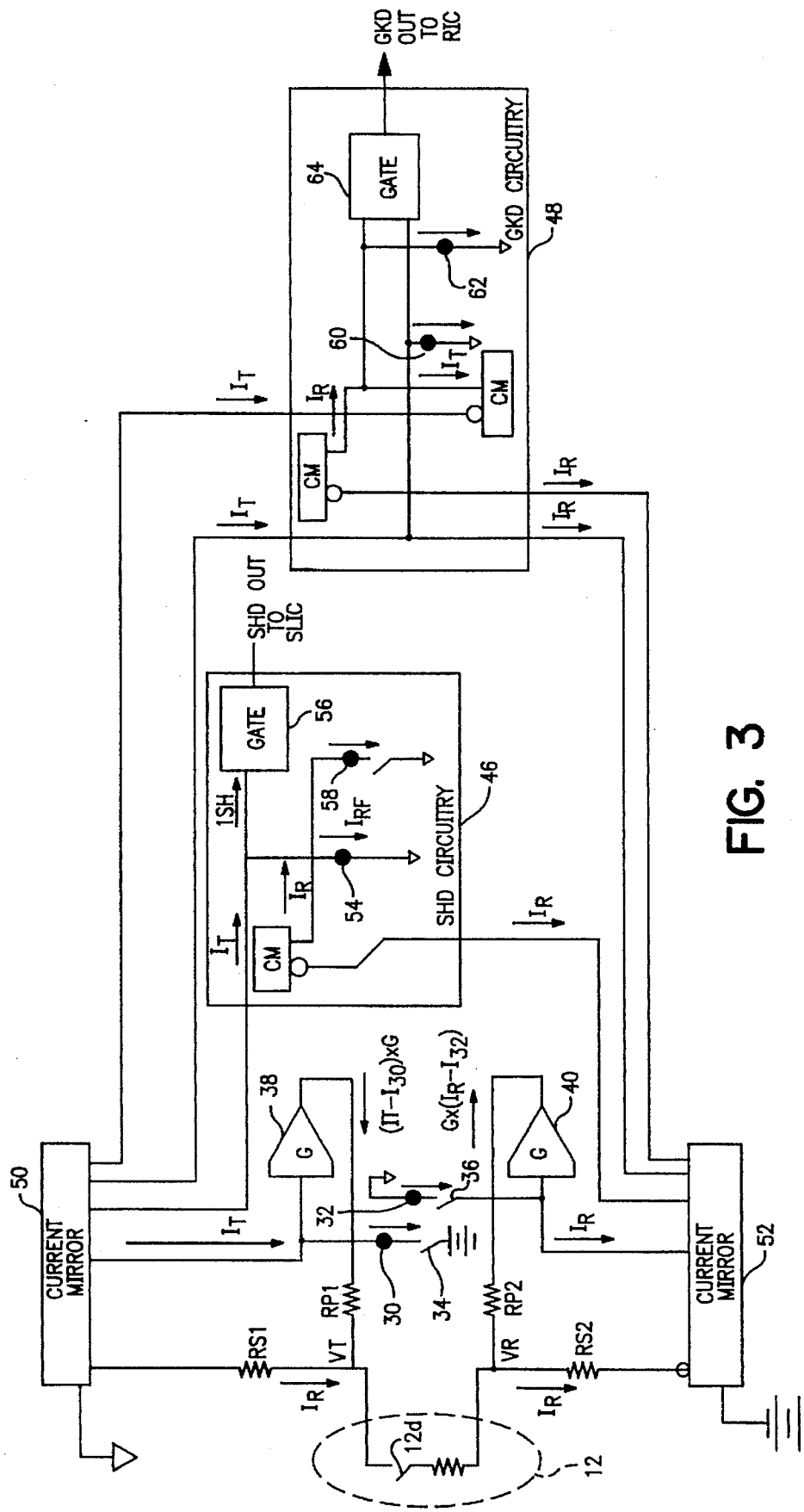
FIG. 3 is a schematic drawing of an embodiment of the present invention illustrating loopback test, switch-hook detection, and ground key detection circuitry.

With reference now to FIG. 3, an embodiment of the present invention may include SHD circuitry 46 and GKD circuitry 48 adapted to function with the loopback test circuitry of FIG. 2. Current mirrors 50 and 52 may provide copies of $I_T$ and $I_R$ to the SHD and GKD circuitry in the manner illustrated. The SHD circuitry 46 operates in the current mode and compares the sum of $I_T$ and $I_R$ to a reference current $I_{REF}$ provided by current source 54. When the sum of $I_T$ and $I_R$ exceeds $I_{REF}$, ISH is positive and gate 56 provides a "true" signal to the SLIC. Conversely, if the sum of $I_T$ and $I_R$ does not exceed $I_{REF}$, ISH is negative and gate 56 provides a "false" signal to the SLIC. An embodiment of the SHD circuitry 46 is discussed further in U.S. patent application Ser. No. 08/380,413, filed concurrently herewith and entitled METHOD AND CIRCUIT FOR FAILSAFE SWITCH-HOOK DETECTION DURING FAULT IN A TELEPHONE SYSTEM, that is incorporated by reference. As discussed therein SHD circuitry may include a comparison of one of a tip current and a ring current to a reference current. The reference current may be a conventional switch-hook detection threshold current, $I_{SHD}$, times a factor $(G_0+1)^{-1}$, where $G_0$ is the predetermined operating gain of the amplifier in the SLIC.

When on-hook transmission is desired, current source 58 may be turned on to adjust the SHD threshold. The currents provided by current sources. 30, 32 and 58 may all be the same so that current $I_{58}$ adjusts the SHD threshold to compensate for currents $I_{30}$ and $I_{32}$.

GKD circuitry 48 detects an imbalance in either direction, i.e., $I_T>I_R$ and $I_R>I_T$ so that a leakage in either part of the circuit may provide a GKD "true" indication to the SLIC. The circuitry may include two current sources 60 and 62 that may provide the same current value. Thus, if $I_T>I_R +I_{60}$ or if $I_R>I_T+I_{62}$ then one of the currents entering gate 64 will be positive and the gate will provide a GKD "true" indication.

Another function performed in telephone systems is on-hook transmission (i.e., transmission without switch-hook detection). On-hook transmission may be used to send data, such as caller ID. With reference again to FIG. 2, when the telephone 12 is on-hook, the voltages at nodes VT and VR are collapsed to the rails (i.e., VT to ground and VR to battery, battery being negative), and the nodes have no room to transmit signals. For example, node VT can move towards battery, but can not move any closer to ground. The current sources 30 and 32, when on and connected by switches 34 and 36, can serve the additional function of enabling on-hook transmission since they move the nodes VT and VR away from the rails and thereby allow room for signals to pass undistorted. However, since the $I_{30}$ and $I_{32}$ were selected to give a SHD, the SHD threshold may be adjusted (i.e., increased) to avoid a SHD during on-hook transmission, although desirably not increased enough so that an actual SHD triggered by closing switch 12d will not trigger a SHD. Switch-hook detection threshold adjustment may use conventional circuitry 66.

Thus, if the current sources 30 and 32 are to be used for on-hook transmission, the current sources are turned on and connected to pull nodes VT and VR away from the rails as in a loopback test, and the SHD threshold is increased so that the SHD indication to the SLIC remains "false". If the telephone goes off-hook during on-hook transmission (i.e., the subscriber lifts the handset) the SHD indication becomes "true" and the on-hook transmission is stopped. This allows the central office to use on-hook transmission as desired, until the subscriber takes over the line.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for loopback testing a telephone subscriber line interface circuit (SLIC) comprising the steps of:
   (a) connecting separate current sources to each of tip and ring circuits from which switch-hook is detected in the SLIC; and
   (b) evaluating whether a loopback test of the SLIC is successful by using current from the current sources in a switch-hook detection circuit of the SLIC.

2. The method of claim 1 further comprising the step of selecting current values for the current sources that are separated by an amount sufficient to indicate switch-hook detection when connected.

3. The method of claim 2 further comprising the step of indicating a successful loopback test with a switch-hook detection.

4. The method of claim 1 further comprising the step of connecting each of the separate current sources to an input of a different one of plural current amplifiers of the SLIC.

5. The method of claim 1 wherein the SLIC further comprises a ground key detect circuit that indicates whether the ring circuit is connected to ground, and further comprising the step of evaluating whether a loopback test of the SLIC is successful by using current from the current sources in the ground key detect circuit of the SLIC.

6. The method of claim 5 further comprising the step of indicating an unsuccessful loopback test with a ground key detection.

7. The method of claim 6 further comprising the step of indicating a successful loopback test with a switch-hook detection.

8. A method for loopback testing a telephone subscriber line interface circuit (SLIC) having switch-hook detection and ground key detection circuits comprising the steps of providing a switch-hook detection indication and not providing a ground key detection indication when the loopback test is successful, and not providing a switch-hook detection indication or providing a ground key detection indication when the loopback test is unsuccessful.

9. A method of using a switch-hook detection circuit in a telephone subscriber line interface circuit (SLIC) for loopback testing and on-hook transmission comprising the steps of:
   (a) connecting separate current sources to each of tip and ring circuits from which switch-hook is detected in the SLIC;
   (b) conducting a loopback test of the SLIC by using current from the current sources in the switch-hook detection circuit of the SLIC in which a successful loopback test is indicated with a switch-hook detection; and
   (c) performing on-hook transmission using current from the current sources in the switch-hook detection circuit of the SLIC by setting a switch-hook detection threshold so that a switch-hook detection is not indicated by connection of the current sources.

10. The method of claim 9 further comprising the step of indicating switch-hook detection when a telephone connected to the SLIC goes off-hook during on-hook transmission.

11. A loopback test circuit for a telephone subscriber line interface circuit (SLIC) having tip and ring circuits from which switch-hook detection is indicated, the loopback test circuit comprising:
   a first current source connected to the tip circuit and a second current source connected to the ring circuit when a loopback test is conducted,
   said first and second current sources for providing currents that are separated by an amount sufficient to indicate switch-hook detection when the loopback test is conducted so that a successful loopback test is indicated by switch-hook detection.

12. The loopback test circuit of claim 11 wherein the SLIC further comprises two current amplifiers, one for each of the tip and ring circuits, and wherein each of said first and second current sources is connected to an input of a different one of the two current amplifiers.

13. The loopback test circuit of claim 11 wherein the SLIC further comprises a ground key detect circuit that indicates whether the ring circuit is connected to ground, and the loopback test of the SLIC uses current from said first and second current sources in the ground key detect circuit of the SLIC so that an unsuccessful loop-back test is indicated by ground-key detection.

14. The loopback test circuit of claim 11 wherein the SLIC is an integrated circuit and loopback test circuit is integrated therewith.

15. A loopback test circuit for a telephone subscriber line interface circuit (SLIC) having switch-hook detection and ground key detection circuits comprising:
   first means for providing a switch-hook detection indication when the loopback test is successful; and
   second means for providing a ground key detection indication when the loopback test is unsuccessful.

16. The loopback test circuit of claim 15 wherein said first means does not provide a switch-hook detection indication when the loopback test is unsuccessful; and
   wherein said second means does not provide a ground key detection indication when the loopback test is successful.

17. A switch-hook detection (SHD) circuit for a telephone SLIC having tip and ring circuits, the SHD circuit comprising:
   a first current source selectably connected to the tip circuit and a second current source selectably connected to the ring circuit;
   means for indicating a SHD by using current from said first and second current sources when a telephone connected to the SLIC is on-hook;
   means for performing on-hook transmission using current from said first and second current sources in the switch-hook detection circuit wherein a switch-hook detection threshold is set so that a switch-hook detection is not indicated by connection of said current sources.

18. The SHD circuit of claim 17 wherein the SLIC further comprises two current amplifiers, one for each of the tip and ring circuits, and wherein each of said first and second current sources is connected to an input of a different one of the two current amplifiers.

* * * * *